March 23, 1926.
J. W. DEES
FISHING POLE SUPPORT
Filed Jan. 16, 1925
1,577,612
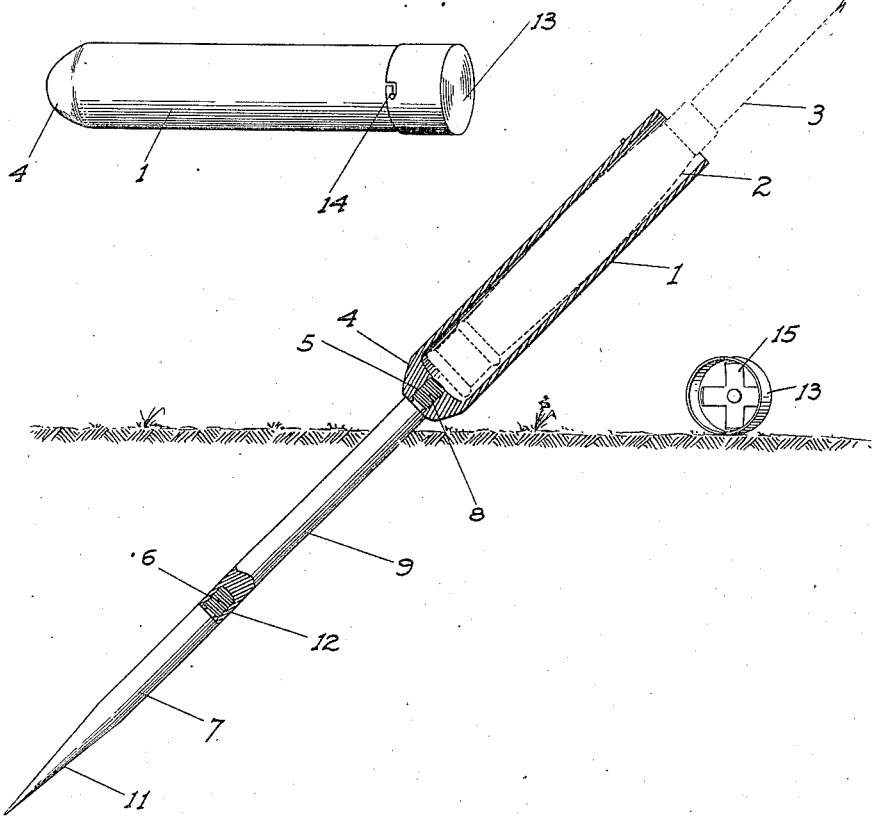
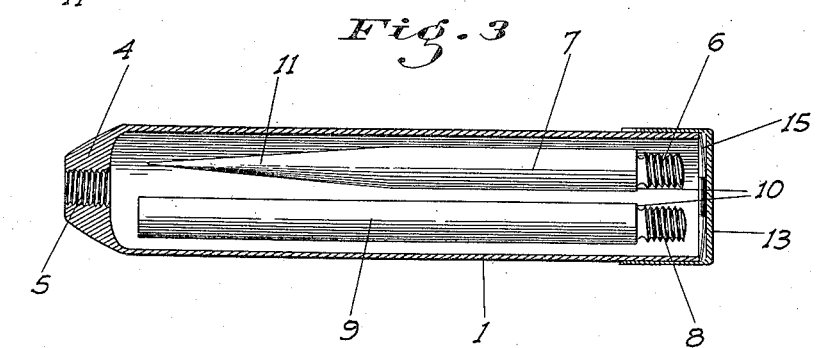
INVENTOR
John W. Dees
BY
ATTORNEY Patented Mar. 23, 1926.

1,577,612

UNITED STATES PATENT OFFICE.

JOHN W. DEES, OF STOCKTON, CALIFORNIA.

FISHING-POLE SUPPORT.

Application filed January 16, 1925. Serial No. 2,830.

*To all whom it may concern:*

Be it known that I, JOHN W. DEES, a citizen of the United States, residing at Stockton, county of San Joaquin, State of California, have invented certain new and useful Improvements in Fishing-Pole Supports; and I do declare the following to be a full, clear, and exact description of the same, reference being had to the accompanying drawings and to the characters of reference marked thereon, which form a part of this application.

This invention relates to a device for supporting a fishing pole at any desired angle relative to the ground without the user having to maintain a grip on the pole.

The principal object of my invention is to provide a device of this character so constructed that the pole may be rigidly supported from a sufficient mud bank or one of much harder formation with equal facility, and yet be instantly removable without disturbing the support when manual manipulation of the pole as in "playing" a fish is necessary.

Another object of the invention is to provide a device formed of several detachable members which together form a structure of considerable length and of great rigidity, but which when not in use may be arranged together in a manner to form a compact article which may be carried in a pocket.

A further object of the invention is to produce a simple and inexpensive device and yet one which will be exceedingly effective for the purposes for which it is designed.

These objects I accomplish by means of such structure and relative arrangement of parts as will fully appear by a perusal of the following specification and claim.

In the drawings similar characters of reference indicate corresponding parts in the several views:

Fig. 1 is a perspective elevation of the device as it appears when not in use and ready for transportation.

Fig. 2 is a sectional elevation of the device with the detachable parts assembled in operative relation and showing the device positioned as in use to support a pole.

Fig. 3 is a sectional elevation of the outer member of a device showing the detachable sections disposed in the interior of the same.

Referring now more particularly to the characters of reference marked on the drawings, the numeral 1 denotes a socket member of suitable diameter and length and open on one end to receive the handle portion 2 of a fish pole 3 therein.

The closed end 4 of the socket 1 is made relatively thick so that a tapped hole 5 therethrough may have a considerable number of threads. The hole 5 is considerably smaller than the socket and the outer surface of the socket adjacent the solid end 4 preferably slopes inwardly toward the centrally located hole 5 to avoid sharp corners.

Adapted to removably screw into the hole 5 is the threaded end 6 of a spike-rod 7 or the similarly threaded end 8 of an extension rod 9. Both ends 6 and 8 are smaller than the main portions of the rods of which they are a part so as to provide shoulders 10 to abut against the part 4 and make a firm bearing and support therewith.

The spike-rod 7 has a long pointed end portion 11 opposite to the threaded end 6 in order that it may easily penetrate into either hard or soft ground. The rod 9 is straight throughout and is the same diameter as the rod 7. On its end opposite the threaded end 8 thereof the said rod has a tapped socket 12 to receive the threaded end 6 of the rod 7. The rods 7 and 9 are substantially equal in length and are of such length and diameter relative to the length and diameter of the socket 1 that when said rods are separated from each other and from the socket they may both be placed wholly within said socket.

The open end of the socket has a removable cap 13 having a bayonet lock connection 14 with the socket. A flat spring 15 is concealed in the cap to bear against the socket when the cap and socket are locked together to prevent said cap from being too easily displaced.

In operation if the ground where the user desires to fish is soft the rods 7 and 9 are coupled together and the latter to the socket to make a continuous spike of considerable length, which may be pressed into the ground in the desired angle until the socket about touches the ground. By doing this the relatively weak rods are braced against deflection by the surrounding ground.

If the ground is of a hard nature, however, the spike-rod 7 alone may be connected to the socket so that the rod may be pressed into the ground without excessive effort the necessary distance to bring the socket close to the ground as is desirable.

Although I have shown only one of the extension rods 9, there is room in the socket 1 for another one of such rods, which of course would enable a still greater length of spike to be provided if necessary.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claim.

Having thus described my invention what I claim as new and useful and desire to secure by Letters Patent is:

A fishing pole support comprising a socket member having a bore through from one end to a point short of the other end and of a diameter to receive the butt of a fishing pole, the closed end being provided with a threaded orifice, and a spike threaded for engagement with the said threaded orifice and of a length to be received and enclosed within the socket member.

In testimony whereof I affix my signature.

JOHN W. DEES.